US005325954A

United States Patent [19]

Crittenden et al.

[11] Patent Number: 5,325,954

[45] Date of Patent: Jul. 5, 1994

[54] ORIENTER

[75] Inventors: Bradley J. Crittenden, Port Moody; Derek Barnes, West Vancouver; Robert M. Knudson, Coquitlam; Frank L. Laytner, Burnaby, all of Canada

[73] Assignee: Trus Joist MacMillan, Boise, Id.

[21] Appl. No.: 83,238

[22] Filed: Jun. 29, 1993

[51] Int. Cl.[5] .............. B65G 47/24

[52] U.S. Cl. .............. 198/382; 198/396; 198/533

[58] Field of Search .............. 198/382, 533, 396, 383, 198/390, 392, 393, 397; 425/81.1, 82.1, 83.1, 110

[56] References Cited

U.S. PATENT DOCUMENTS

| | | | |
|---|---|---|---|
| 3,115,431 | 12/1963 | Stokes et al. . | |
| 3,807,931 | 4/1974 | Wood et al. . | |
| 4,380,285 | 4/1983 | Burkner et al. | 198/533 |
| 4,494,919 | 1/1985 | Knudson et al. | 198/382 X |
| 4,505,868 | 3/1985 | Krueger et al. | 198/382 X |
| 4,506,778 | 3/1985 | Kilpela | 198/382 |
| 4,623,058 | 11/1986 | Bossier | 198/382 |
| 4,666,029 | 5/1987 | Burkner | 198/382 |
| 4,836,388 | 6/1989 | Bielagus | 198/382 X |

FOREIGN PATENT DOCUMENTS 920529 2/1973 Canada .

*Primary Examiner*—Cheryl L. Gastineau

*Attorney, Agent, or Firm*—C. A. Rowley

[57] ABSTRACT

A strand preorienter is formed by a plurality of spaced parallel preorienter shafts each having a plurality of preorienter discs mounted thereon in axially spaced relationship. The preorienter discs on adjacent shafts overlap and form preorienter partition walls which defined opposite sides of preorienter passages through which the strands fall onto an orienter having orienter passages that align the strands as required. The preorienter passages are significantly wider than the orienter passages and have their outlets positioned immediately above the orienter.

17 Claims, 4 Drawing Sheets

ORIENTER

FIELD OF THE INVENTION

The present invention relates to strand orienters, more particularly the present invention relates to a strand orienter for orientating strands and/or long wafers for the manufacture of oriented strand panels and/or lumber.

BACKGROUND OF THE PRESENT INVENTION

The term strand as used throughout this application is intended to include wood elements known in the trade as strands, wafers, clipped veneer, and the like and particularly long strand which define strands having axial lengths of at least on average above 6 inches (15 cm).

Many different devices have been proposed for orienting strands for forming of oriented strand boards. Some employ discs, others employ plates or partitions, but in each system the object is to obtain the best orientation of the longitudinal axes of the strands substantially parallel to each other and usually to the longitudinal axis of the panel being made.

One such device is shown in U.S. Pat. No. 3,115,431 issued Dec. 24, 1963, to Stokes et al. This device includes the plurality of intermeshed rotating discs mounted on a plurality of substantially parallel side-by-side shafts positioned in a plane. The discs on the shafts are uniformly positioned intermediate discs on their adjacent shafts. In the arrangement described, the discs on adjacent shafts turn in the same direction, except for the last discs in the sequence which turn in the opposite direction. This type of arrangement (hereinbelow referred to as the Stokes' arrangement) has been found satisfactory particularly for use with long strands. The disclosure of the Stokes et al. patent is incorporated herein by reference.

Another similar device is shown in the Burkner U.S. Pat. No. 4,666,029 issued May 19, 1987 but wherein the discs on adjacent shafts are arranged in pairs in side by side relationship with the discs forming one of the pairs defining one side of an orienting passage and the discs forming the next axially space pair defining the other side of the passage. This arrangement (hereinafter referred to as Burkner's arrangement) is also satisfactory but the Stokes' arrangement is less complicated and appears to be about as effective in aligning the strands as the Burkner arrangement. The Burkner et al. patent is incorporated herein by reference.

U.S. Pat. Nos. 4,380,285 issued Apr. 19, 1983 to Burkner and 4,623,058 issued in Nov. 18, 1986 to Bossier each shows a combination of discs mounted on spaced parallel shafts and positioned above and intermediate stationary substantially vertical guide walls forming opposite walls of orienting passages through which the strands fall and are oriented. This type of orienter also has not been found to be particularly satisfactory for producing an end product with the required orientation and strength.

Canadian patent 920,529 issued Feb. 6, 1973 to Turner et al. shows yet another form of orienter wherein partition walls are designed to move to prevent plugging.

U.S. Pat. No. 3,807,931 issued Apr. 30, 1974 to Wood et al. describes another form of orienter which use a number of vertically stacked decks each formed by stationary vertical fins each provided with a vibrating cap that improve movement of the wood particle there between. Each deck has a number of fins that is a multiple of the number of fins in the deck immediately above it so that the fins on the upper deck directly overlie corresponding fins on the lower deck and the the flow of strands is divided by the upper deck and the divisions so formed further subdivide by the next lower deck. In this device, the spacing between the fins on the top deck is about half the average length the strands that are to be oriented and the spacing between the upper and lower deck is defined as the distance greater than the average length of the strands. The orienting system of this patent clearly would not be effective for long wafers nor would it function well for conventional length (3 to 4 inch) strands.

U.S. Pat. No. 4,494,919 issued Jan. 22, 1985 to Knudson et al. describes another form of apparatus for orienting strands particularly suited to orienting and distributing of long strands.

BRIEF DESCRIPTION OF THE PRESENT INVENTION

It is an object of the present invention to provide an orienter particularly suited to orient strands (particularly long wafers) in substantially parallel relationship, i.e., within less than $\pm 10°$ of a selected axis without plugging at commercial feed rates for strands.

Broadly the present invention relates to an orienter system for orienting strands with their longitudinal axes substantially parallel comprising an orienter formed by a plurality of spaced parallel orienting shafts each mounting a plurality of axially spaced radial orienter discs, said orienter discs on adjacent of said orienter shafts overlapping, a plurality of orienting passages said orienting passages having their longitudinal axes substantially parallel and through which said strands pass and are aligned with their longitudinal axes substantially parallel to said longitudinal axes of said orienting passages and form a mat, said orienting discs defines opposite sides of said orienting passages, a preorienter positioned directly above said orienter, said preorienter including a plurality of spaced parallel preorienter shafts having their axes substantially perpendicular to said longitudinal axes of said orienting passages, a plurality of preorienter discs mounted in axially spaced relationship on each of said preorienter shafts, each said preorienter disc extending substantially radially of its preorienter shaft, said preorienter discs on adjacent of said preorienters shafts overlapping, a plurality of preorienter passages, said preorienter passages having their longitudinal axes substantially parallel to said longitudinal axes of said orienting passages and having their opposite sides defined by said preorienter discs, said preorienter passages having widths W at least twice as wide as widths X of said orienting passages therebelow, said widths being measured perpendicular to said longitudinal axes of said passages and the direction of flow of said strands through said passages and means for mounting said preorienter discs so that the maximum spacing T between their peripheries and the adjacent portions of the top of said orienter passages is not more than 12 inches (7.5 to 30 cm) but does not exceed the average or mean length L of strands to be oriented.

Preferably orienter shafts will be positioned in a first plane and said preorienter shafts will be positioned in a second plane and said first and said second planes will be substantially parallel.

Preferably, said preorienter shafts will be interposed between adjacent said orienter shafts in the direction measured parallel to said longitudinal axes of said passages.

Preferably, the widths W of said preorienter passages are at least three times the widths X of said orienter passages and no greater than six times the width X of said orienter passages directly therebelow.

Preferably, said orienter discs and said preorienter discs are essentially the same diameter and said preorienter shafts will be positioned mid way between said orienter shafts measured parallel to said longitudinal axes of said passages.

Preferably, the spacing between the periphery of each said preorienter discs and its adjacent said orienting discs will not exceed 2 inches (5 cm), and is at least 1 inch (2.5 cm).

Preferably, said orienter will further include means to rotate said preorienter discs in the same direction to tend to move said strands carried thereby towards one end of said preorienter.

Preferably, said means to rotate will also rotate all of said orienter discs in the same direction to tend to move said strands carried thereby towards the end of said orienter adjacent said one end of said preorienter.

Preferably, the widths W of said preorienter passages measured along the axes of said preorienter shafts will be in the range of 0.6 L to 0.8 L where L is the average or mean length of said strand to be oriented.

BRIEF DESCRIPTION OF THE DRAWINGS

Further features, objects and advantages will be evident from the following detailed description of the preferred embodiments in the present invention take in conjunction with the accompanying drawings in which.

DESCRIPTION OF THE PREFERRED EMBODIMENTS

The present invention may be used to orient strands but is most useful for long strands having length of at least 6 inches.

Figure 1:
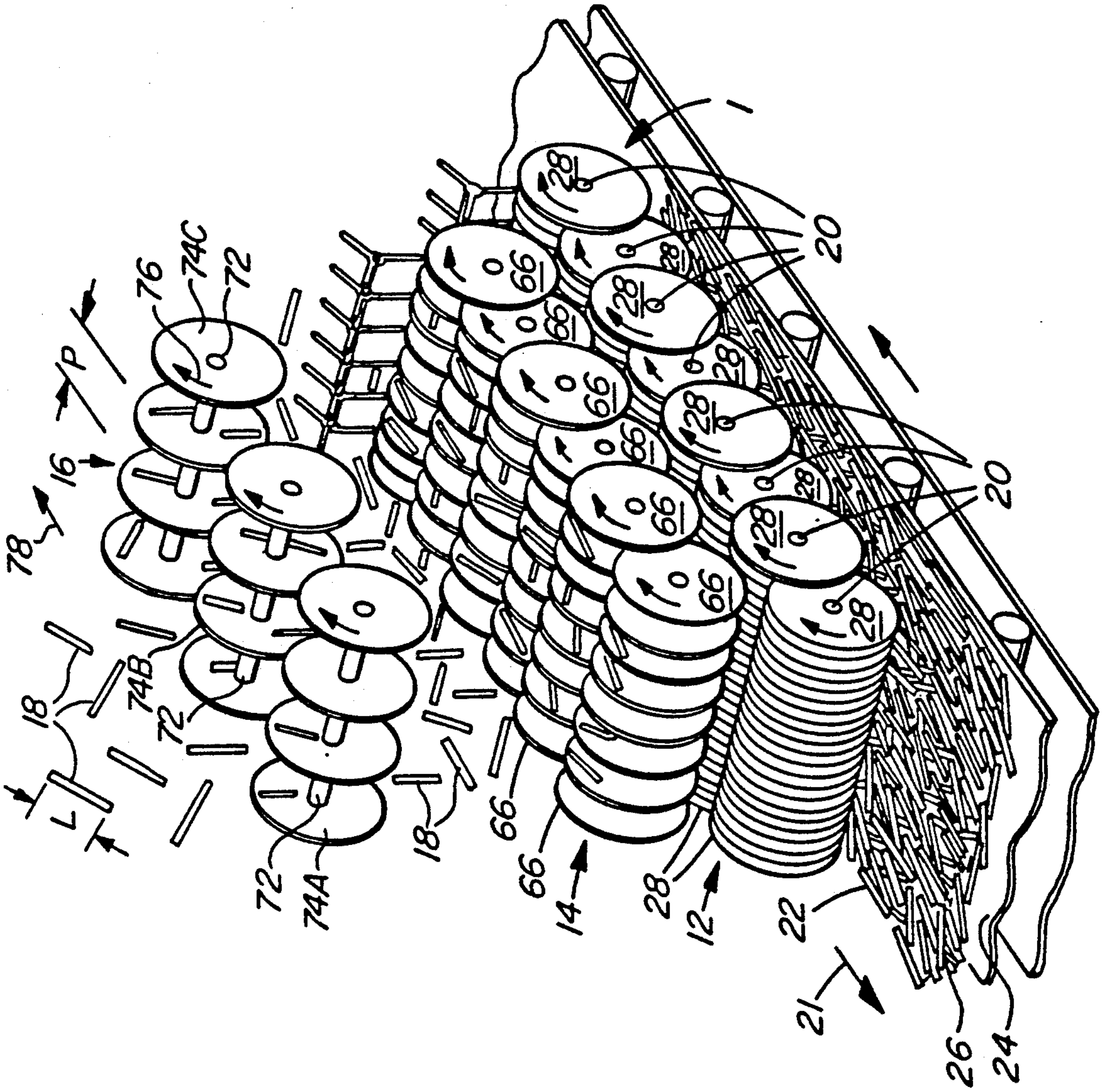
FIG. 1 is an isometric schematic illustration of the orienting system of the present invention.

As shown in FIG. 1, the orienter system of the present invention is formed by an orienter generally indicated at 12 having a preorienter 14 positioned there above and in the illustrated arrangement adjacent to one end of the orienter 12. Positioned above the preorienter 14 is a distributor 16 that spreads or distributes the strands 18 to be oriented. The strands 18 fall through the distributor 16 onto the preorienter 14 and are directed to and their entry into the orienter 12 facilitated. The orienter 12 completes the alignment or orientation of the strands 18 as will be described in more detail herein below.

Figure 2:
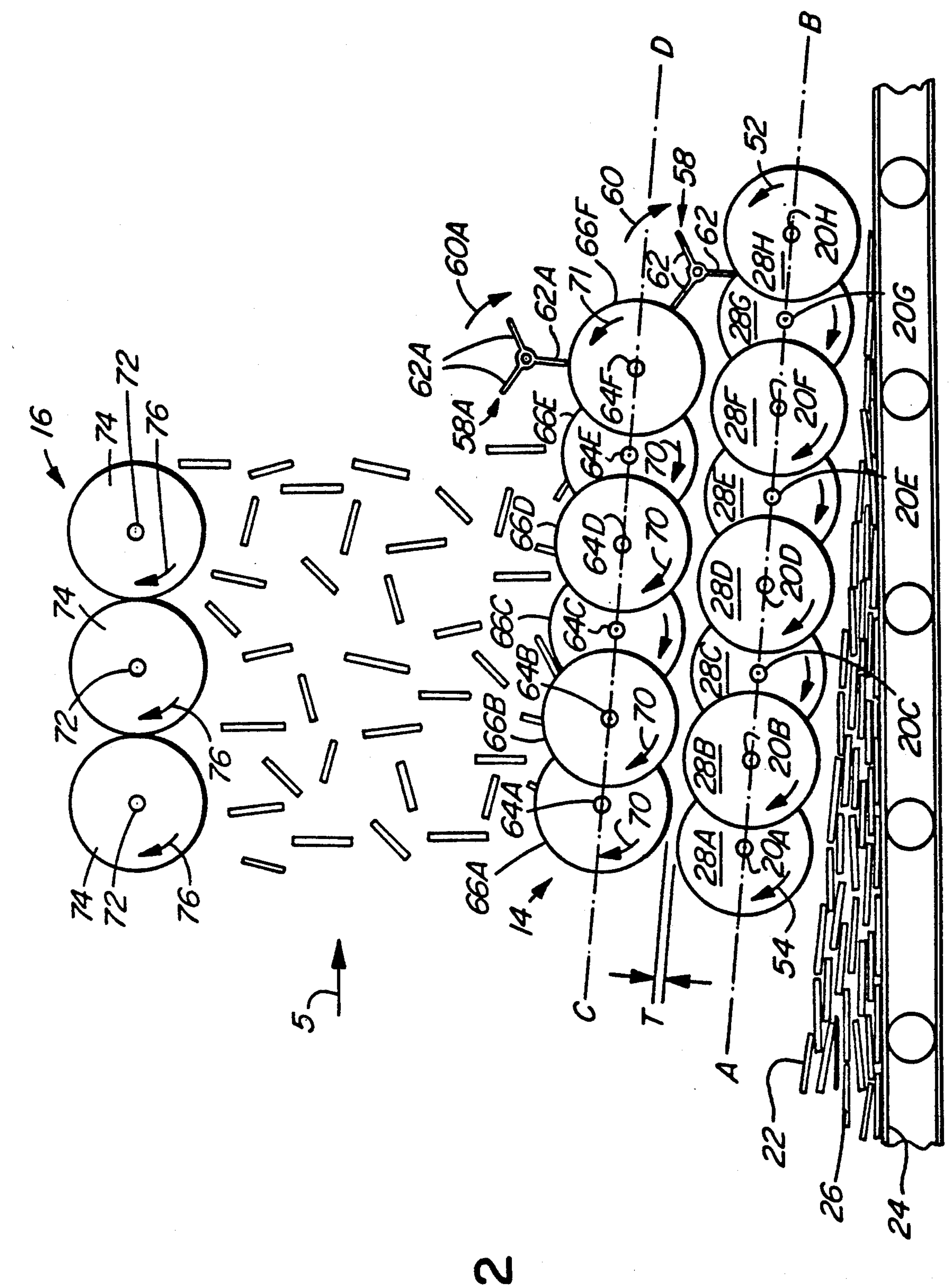
FIG. 2 is a schematic side elevation illustrating the position of the orienter, preorienter and distributor.

The orienter 12 is formed by a plurality of parallel shafts 20 (designated as 20A, 20B, 20C, etc.) positioned in a plane as represented by the line AB in FIG. 2 and which is shown substantially parallel to the upper surface 22 of a mat or layup 26 found on the receiving conveyor 24 (see FIG. 1) is formed. The depth of the mat 26 tapers due to the relative movement of the conveyor 24 to the orienter 12 as indicated by the arrow 21 and in practise the plane AB will normally extend at an angle to the surface of the conveyor 24 so that the plane AB is substantially parallel with the upper surface 22 of the mat 26. It is not necessary that the shafts all be positioned in a plane as indicated, but this arrangement is preferred.

Figure 3:
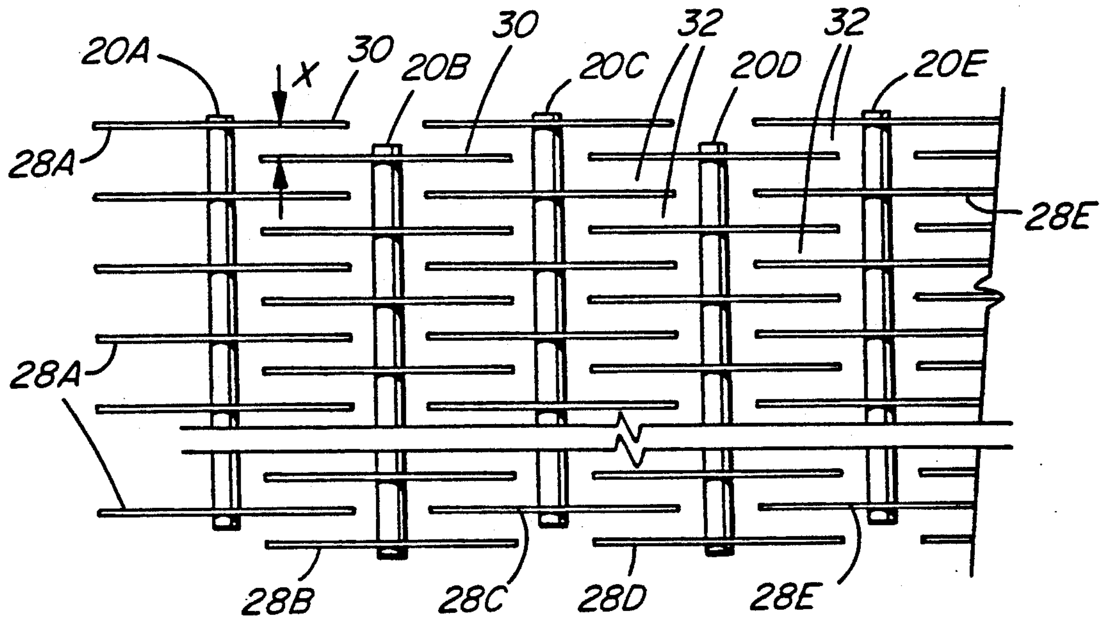
FIG. 3 is a schematic plan of one disc arrangement for the orienter (or preorienter).
Figure 4:
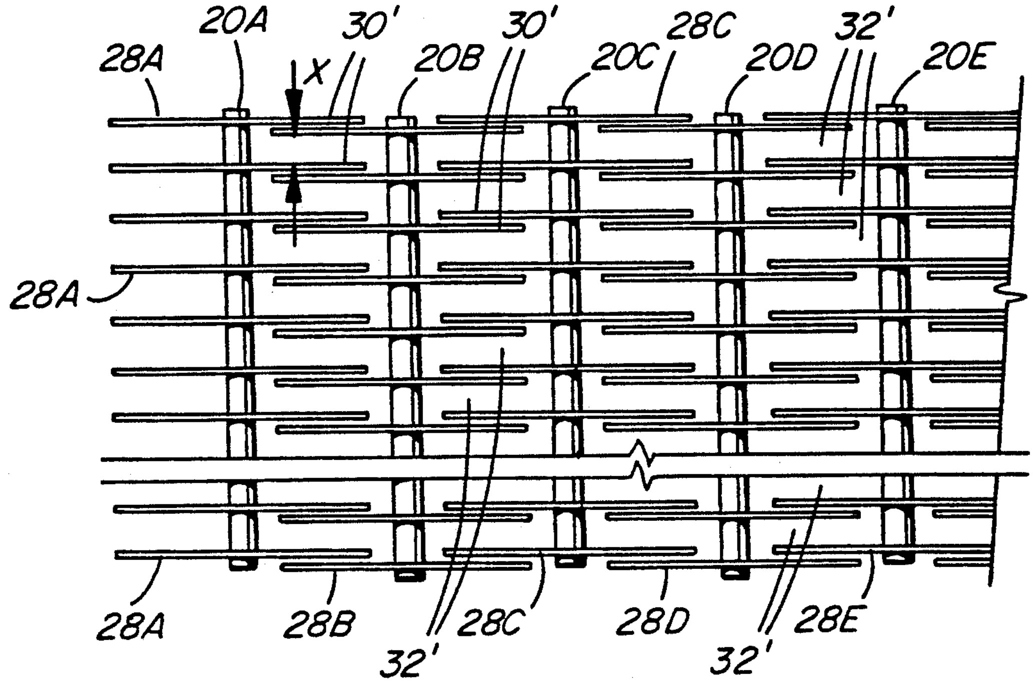
FIG. 4 is a schematic plan of another disc arrangement for the orienter (or preorienter).

Each of the shafts 20 has mounted thereon in axially spaced relationship a plurality of radially extending orienter discs 28 (followed by the letter A, B, C, etc., corresponding to the shaft on which it is mounted). The position and spacing of the discs 28 contribute significantly to obtaining the required throughput and alignment of the strands. The discs may be positioned to define the opposite side walls 30 of the orienter passages 32 either using the Stokes' arrangement wherein the discs on one shaft are positioned substantially mid way between the discs on the adjacent shafts 20 (see FIG. 3) or the Burkner arrangement wherein the discs on adjacent shafts are arranged in pairs to define walls of the orienter passages (see FIG. 4). The Stokes arrangement (FIG. 3) is preferred.

In either of the arrangements the longitudinal axes of the orienting passages 32 extend perpendicular to the axis of the axials 20A, 20B, 20C, etc. and their opposite side walls 30 are defined by the discs 28. In the Stokes' arrangement the discs 28 on alternative shafts 20 form one of the walls 30 of each passage 32 (i.e. shafts 20A, 20C, 20E) and the discs 28 on intermediate shafts 20 form the other wall 30 of each of the passages 32 (i.e. shafts 20B, 20D). In the Burkner arrangement the discs 28 on adjacent shafts form cooperating pairs to provide the side walls $30^1$ of the passages $32^1$ (i.e. the discs 28A and 28B cooperate to form a short length or section of each of the walls $30^1$; discs 28B and 28C another portion; and so on).

The width X of the passages 32 is important to obtaining the desired degree of orientation of the strands being oriented, the smaller the width X the better the orientation provided the spacing of the orienter above the mat 26 is sufficiently close. However, the width X should not be too small or the throughput through the orienter 12 will be significantly impaired.

Care must also be taken to ensure that the strands to be oriented do not have two dimensions that are exceptionally long. Usually the average strand length will be longer than 6 inches thus their width should be no wider than about 1 inch. If significantly wider strands are used, e.g. in the order of 2 to 3 inches the equipment is likely to plug unless the width X of the orienter passages is significantly increased above the width that provides orientation of the strands in the $\pm 10°$ range required.

The last shaft 20H is provided with a plurality of discs 28H which are positioned intermediate to discs 28G, i.e. equally spaced from or midway between the adjacent discs 28G.

Referring back to FIG. 2, each of the discs 28 is rotated in the same direction, i.e., in the particular example illustrated in the clockwise direction as indicated by the arrow 54 so that any strands carried on the upper peripheries of the discs 28 tend to travel toward the end of the former 12 at which the discs 28H are mounted. The discs 28H, (i.e., on shaft 20H) preferably rotate in the opposite direction, i.e., in the counterclockwise direction as indicated by the arrow 56.

Mounted above and between the last set of discs 28G and 28H as indicated in FIGS. 1 and 2 is a kicker 58 which is rotated as indicated by the arrow 60 in the clockwise direction so that the arms 62 pass between the discs 28G and 28H and tend to rearrange strands carried on the surface of these discs and direct them to fall into the passages formed between these discs 28G and 28H.

Any strands that pass the kicker 58 are transferred to the discs 28H and since the discs 28H rotate in the opposite direction and are positioned midway between the discs 28G, there is a stronger tendency to force the strands to fall between the discs and onto the mat 26 being formed.

As above indicated, the plane AB (assuming the shafts 20 are positioned in a plane) will preferably be substantially parallel to the surface of the mat 26 (FIG. 1) being formed as it is important that the spacing between periphery of the discs 28 and the surface 22 of the mat 26 be maintained relatively small otherwise the strands lose orientation and the effectiveness of the orienter 12 may be significantly diminished. Generally, this spacing is between about 3 inches (7.5 cm) and 1 inch (2.5 cm) and preferably the spacing between the peripheries of the discs and the upper surface of the mat 26 being formed will be less than about 1½ inches (3.75 cm).

This distance or spacing between the bottom of the orienter 12 and the surface of the mat 26 is strand length dependent in that the longer the strand length L the larger the acceptable spacing. This spacing is measured between the closest portion of the periphery of the discs to the plane of the surface 22 of the mat 26.

The orienter 12 may be positioned as illustrated in FIG. 1 with the shaft 20H at the upstream end of the orienter relative to the direction of travel of the upper surface of the receiving conveyor 24 which assuming the upper surface is horizontal and the upper surface 22 of the mat 26 slopes down to the right in FIGS. 1 and 2. The shaft 20H would be the lowest and movement of the strands by the discs 28 would be downhill. It is at least as acceptable to reverse the direction of relative movement of the conveyor 24 to the orienter 12 so that the shaft 20H is highest and the strands are moved uphill by the discs 28.

Positioned above the orienter 12 is the preorienter 14 which preferably is constructed in essentially the same way as the orienter 12, i.e. using a plurality of radial discs mounted on rotating shafts.

The shafts or axles 64 (64A, 64B, 64C, - - - 64F) of the preorienter 14 are preferably arranged in the plane CD which in the illustrated arrangement is fixed relative to the plane AB and is preferably substantially parallel to the plane AB. Each of the shafts 64 has a plurality of axially spaced discs 66 (66A on shaft 64A; 66B on shaft 64B; etc.) equivalent to the discs 28 on the orienter 12. These discs 66 may be mounted in the Stokes' arrangement or the Burkner arrangement described above. The arrangement used in the preorienter 14 need not be the same as that used in the orienter 12, but as with the orienter the Stokes' arrangement is also preferred for use in the preorienter 14.

The spacing between the discs 66 on adjacent shafts 64 defines the widths W of the preorienter passages 68 in the same manner as the widths X of the orienter passages 32 were defined.

The number of shafts 64 used to form the preorienter 14 is based on the optimum production (throughput) which is in part determined by the axial spacing of the discs 28 and 66 i.e. widths X and W of the passages 32 and 68 and the distribution of the strands over the preorienter 14 by the distributor 16.

Positioned over the discs 66F, i.e. the last disc to the right in FIG. 2 which is rotated in the opposite direction 71 (counterclockwise) relative to the other discs 66 which rotate in the direction 70 (clockwise), is a second kicker 58A similar to the kicker 58 and having arms 62A that pass between the discs 66F as they are rotated in the direction of the arrow 60A (clockwise) to kick any strands carried on the discs 66F backward and cause them to tend to fall into the passages defined between the discs 66E and 66F.

The diameter of the discs 28 and 64 must be sufficient to define a passage length in the direction of flow of the strands that obtains the desired orientation. Adjacent discs 28 on a given shaft 20 may have different diameters as this may alleviate the tendency to plug and similarly the adjacent discs 66 on a given shaft 64 may also have different diameters (as described in one embodiment of the Burkner arrangement in U.S. Pat. No. 4,666,029). When different diameter discs 28 are used the spacing between the top of the mat 26 and the discs will vary depending on the differences in diameters of the discs 28 and this may be detrimental to alignment. This need not be a problem with the spacing between the orienter 12 and preorienter 14 which will be discussed below if the larger diameter discs of the preorienter are adjacent to the smaller diameter discs 28 on the orienter.

It is preferred to make all the discs of the preorienter the same diameter and all the discs of the orienter the same diameter, generally between 20 and 40 inches or about 2 to 5 times the lengths of the strands to be oriented. It is also preferred that the discs 28 and 66 all be the same diameter.

Figure 5:
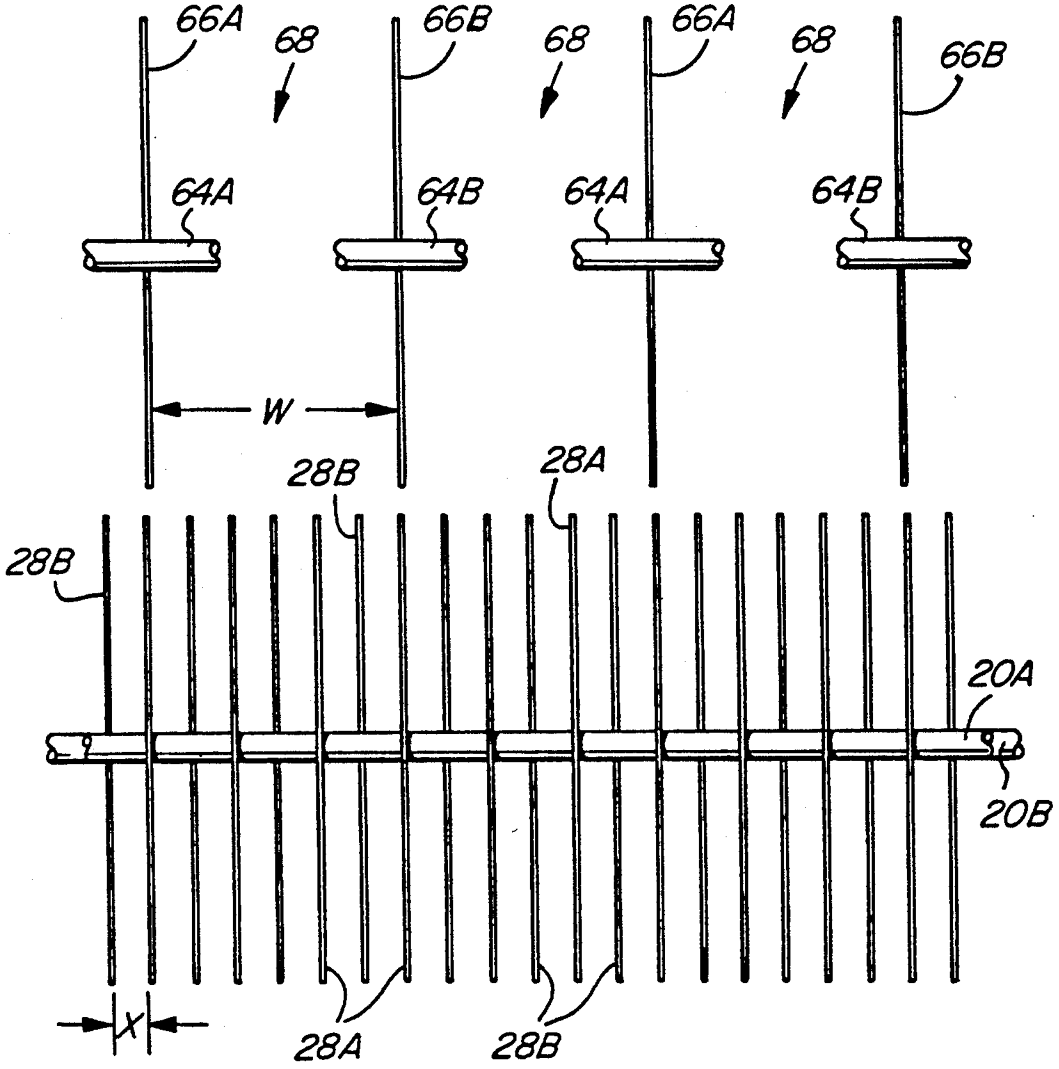
FIG. 5 is a partial end view looking in the direction of the arrow 5 in FIG. 2, schematically illustrating the positioning of the preorienter and orienter discs.

As shown in the side view in FIG. 5, the orienter walls 32 formed by the discs 28 on opposite sides of the passages 30 will be spaced significantly closer together than the walls on opposite sides of the preorienter passages 68. Preferably the passages 68 will be at least as wide as two passages 30 through the underlying portion of the orienter 12, i.e., the distance or spacing W will at least equal 2× in the section 36. In the illustration in FIG. 5 the spacing W is equal to 6×. However, it is preferred not to exceed a ratio of W/X of 5.

The width W in absolute terms is related to the length L (generally the mean or average length) of the strands measured in the longitudinal direction of the strand so that W is at least 0.5 L and is no greater than L and preferably W will be about 0.6 to 0.8 L. The dimension X will generally be in the order of 0.15 L to 0.25 L assuming a strand width measured perpendicular to L is not significantly greater than X to cause plugging as described above.

Referring back to FIG. 2 will be noted as indicated by the arrows 70 that all of the discs 66 except the last discs 66F rotate in the same direction and that in the illustrated embodiment the direction is the same as the direction of rotation 54 of the discs 28 so that any strand 18 carried on the upper surfaces of the discs 66 would be transported toward the end of the preorienter 14 and be realigned to fall between the discs by the kicker 58A and the rotation of the discs 66F in the opposite direction as indicated by the arrow 71.

The spacing between the peripheries of the discs 66 and the adjacent discs 28 on the preorienter and orienter respectively is extremely important and must be relatively small. This spacing between the preorienter 14 and orienter 12 (between the discs 28 and 66 in the arrangement illustrated in FIG. 2) is indicated by the dimension T and should never exceed the average strand length L and preferably will never exceed ¾ of the average strand length. Preferably, the dimension T will be small in the order of about 1 to 2 inches (2.5 to 5.0 cm) regardless of strand lengths (length L less than 3 inches will not likely be used) but sufficient to permit travel of some strands on top of the discs 28. If too large a distance T is maintained the effectiveness of the preorienter 14 in directing the strands into the orienter 12 to facilitate the throughput and orientation is impaired. A minimum distance T should be provided to permit strands that do not immediately pass through the passages 32 to be carried by the discs 28 toward the end of the orienter formed by discs 20H. However, if the distance T is 0 or is negative (the discs 28 and 66 overlap) depending on horizontal spacing between the discs 28 and 66, the system will also function well. Generally, if T approaches 0 or is negative, the ratio of W/X will normally be reduced and any strands carried on the surface of the discs 28 will obviously remain between the discs 66 of the preorienter 14.

Mounted above the preorienter 14 as above described is distributor 16 which is constructed of a plurality of substantially parallel axels 72 each mounting a plurality of discs 74 which are rotated as indipcated by the arrow 76, to move the strands 18 falling thereon in the direction of the arrow 78 and distribute the strands as uniformly as possible over the preorienter 14. It will be apparent from FIGS. 1 that the discs 74 may be mounted in the same manner in the distributor 16 as in the preorienter 14 and orienter 12, but that it is preferred that there be no overlap between the discs 74 on the adjacent shafts 72, i.e., the spacing of the shafts 72 is preferably about the diameter of the discs 74.

As shown in FIG. 1, the spacing P between adjacent discs 74 on the same shaft 72 defining the width of passages through the distributor 16 is wider than the width W of the passages in the preorienter which in turn are spaced wider than the width X of the passages formed by the portion of the orienter 12 underlying the preorienter 14. Preferably P will be equal to between 1.25 and 3 times width W. The diameter of the discs 74 is not critical but preferably will be about the same diameter as discs 66.

Other means for distributing the strands relatively uniformly over the area of the preorienter 14 may be employed for example, U.S. Pat. No. 4,949,919 by Knudson et al. referred to above, provides a specific mechanism for uniformly distributing strands to an orienter as to the above referred to U.S. Pat. Nos. 4,380,285, 4,623,058 and 4,666,029. Canadian patent 973,077 issued Aug. 19, 1975 disclosed another relatively complicated disc system but one that better ensures uniform distribution. It is normally not necessary to ensure the relatively accurate distribution as described in the Canadian patent, however, since the strands tend to pass directly downward through the preorienter and then the orienter with very few of them being carried along the peripheral of the discs 28 and 66, it is important for good mat formation throughput that the strands be uniformly distributed over the preorienter.

In FIGS. 1 to 5 the discs in the orienter, preorienter and distributor have all being shown as circular, i.e., having a circular periphery. It is generally preferred to scalp the edge so that there are periodic indentations circumferentially spaced around the peripheral edge of the discs.

Figure 6:
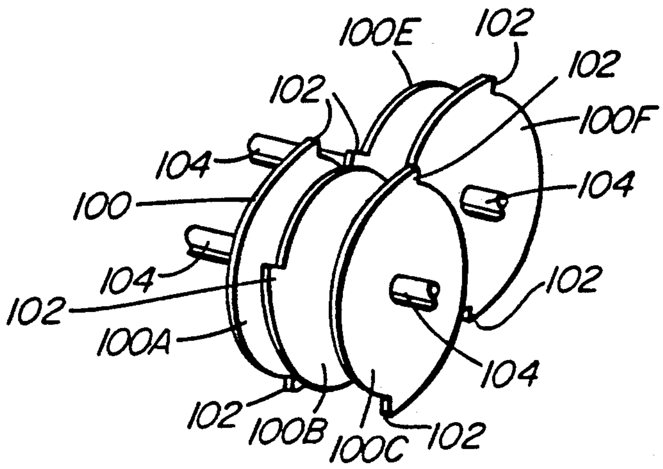
FIG. 6 is a schematic illustration of one form of toothed disc that may be used in the orienter, preorienter and/or distributor.

Discs such as those shown in FIG. 6 are effective for reorienting the strands to fall through the passages. Thus, discs 100 which may be discs of the orienter 12, preorienter 14 or distributor 16, are provided with projections or discrete teeth 102. It will be noted that the teeth 102 on adjacent discs 100A, 100B and 100C on one shaft 104 are relatively angularly offset, e.g. as shown by 90° on the adjacent discs 100A, 100B and 100C. The teeth 102 on the adjacent discs 100E and 100F on the shaft 106 adjacent shaft 104 and so on along the length of the orienter 12, preorienter 14 and distributor 16. It is also preferred that the teeth 104 on adjacent discs on adjacent shafts also be offset so that they reach their top dead center positions at spaced time intervals as illustrated.

Having described the invention, modifications will be evident to those skilled in the art without departing from the spirit of the invention as defined in the appended claims.

We claim:

1. An orienter system for orienting strands with their longitudinal axes substantially parallel comprising an orienter formed by a plurality of spaced parallel orienter shafts each mounting a plurality of axially spaced radial orienter discs, said orienter discs on adjacent said orienter shafts overlapping, a plurality of side by side orienting passages, said orienting passages having their longitudinal axes substantially parallel and through which said strands pass and are aligned with their longitudinal axes substantially parallel to said longitudinal axes of said orienting passages and form a mat, said orienter discs defining opposite sides of said orienting passages, a preorienter positioned directly above said orienter, said preorienter including a plurality of spaced parallel preorienter shafts having their axes substantially perpendicular to said longitudinal axes of said orienting passages, a plurality of preorienter discs mounted in axially spaced relationship on each of said preorienter shafts, each said preorienter disc extending substantially radially of its preorienter shaft, said preorienter discs on adjacent of said preorienter shafts overlapping, a plurality of side by side preorienter passages, said preorienter passages having their longitudinal axes substantially parallel to said longitudinal axes of said orienting passages and having their opposite sides defined by said preorienter discs, said preorienter passages having widths W at least twice as wide as widths X of said orienting passages therebelow, said widths W and X being measured perpendicular to said longitudinal axes of said passages and the direction of flow of said strands through said passages and means for mounting said preorienter discs so that the maximum spacing T between their peripheries and the adjacent portions of the top of said orienter passages is not more than 30 cm (12 inches) but does not exceed the average or mean length L of strands to be oriented.

2. An orienter system as defined in claim 1 wherein said orienter shafts are positioned in a first plane and said preorienter shafts are positioned in a second plane and said first and said second planes are substantially parallel.

3. An orienter system as defined in claim 2 wherein said preorienter shafts are interposed between adjacent said orienter shafts in the direction measured parallel to said longitudinal axes of said passages.

4. An orienter system as defined in claim 1 wherein the widths W of said preorienter passages are at least three times the widths X of said orienter passages and no greater than six times the widths X of said orienter passages directly therebelow.

5. An orienter system as defined in claim 2 wherein the widths W of said preorienter passages are at least three times the widths X of said orienter passages and no greater than six times the widths X of said orienter passages directly therebelow.

6. An orienter system as defined in claim 3 wherein the widths W of said preorienter passages are at least three times the widths X of said orienter passages and no greater than six times the widths X of said orienter passages directly therebelow.

7. An orienter system as defined in claim 3 wherein said orienter discs and said preorienter discs are essentially the same diameter and said preorienter shafts are positioned mid way between said orienter shafts measured parallel to said longitudinal axes of said passages.

8. An orienter system as defined in claim 6 wherein said orienter discs and said preorienter discs are essentially the same diameter and said preorienter shafts are positioned mid way between said orienter shafts measured parallel to said longitudinal axes of said passages.

9. An orienter system as defined in claim 1 wherein said spacing T between the periphery of each said preorienter discs and its adjacent portion of the top of said orienter does not exceed 5 cm (2 inches) and is at least 2.5 cm (1 inch).

10. An orienter system as defined in claim 1 further comprising means to rotate said preorienting discs in the same direction to tend to move said strands carried thereby towards one end of said preorienter.

11. An orienter system as defined in claim 10 wherein said means to rotate also rotates all of said orienter discs in the same direction to tend to move said strands carried thereby towards the end of said orienter adjacent said one end of said preorienter.

12. An orienter system as defined in claim 11 wherein said spacing between the periphery of each said preorienter discs and its adjacent portion of the top of said orienter does not exceed 3.75 cm (1½ inches), and is at least 2.5 cm (1 inch).

13. An orienting system as defined in claim 1 wherein the widths W of said preorienter passages measured along the axes of said preorienter shafts is in the range of 0.6 L to 0.8 L.

14. An orienting system as defined in claim 3 wherein the widths W of said preorienter passages measured along the axes of said preorienter shafts is in the range of 0.6 L to 0.8 L.

15. An orienting system as defined in claim 7 wherein the widths W of said preorienter passages measured along the axes of said preorienter shafts is in the range of 0.6 L to 0.8 L.

16. An orienting system as defined in claim 10 wherein the widths W of said preorienter passages measured along the axes of said preorienter shafts is in the range of 0.6 L to 0.8 L.

17. An orienting system as defined in claim 11 wherein the widths W of said preorienter passages measured along the axes of said preorienter shafts is in the range of 0.6 L to 0.8 L.

* * * * *